（12）United States Patent
Wu et al.

(10) Patent No.: US 10,908,449 B2
(45) Date of Patent: Feb. 2, 2021

(54) SUBSTRATE AND METHOD FOR MANUFACTURING THE SAME, DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiaojuan Wu, Beijing (CN); Chunlei Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/049,598

(22) Filed: Jul. 30, 2018

(65) Prior Publication Data

US 2019/0113804 A1   Apr. 18, 2019

(30) Foreign Application Priority Data

Oct. 13, 2017   (CN) ............................ 2017 1 0953551

(51) Int. Cl.
*G02F 1/1343*   (2006.01)
*G02F 1/167*   (2019.01)
(Continued)

(52) U.S. Cl.
CPC .... *G02F 1/133512* (2013.01); *G02F 1/13624* (2013.01); *G02F 1/133514* (2013.01);
(Continued)

(58) Field of Classification Search
CPC ............... G02F 1/167; G02F 1/134309; G02F 1/133555
See application file for complete search history.

(56) References Cited

U.S. PATENT DOCUMENTS

| 7,084,942 B2 | 8/2006 | Luo |
| 2013/0050066 A1 | 2/2013 | Li et al. |

(Continued)

FOREIGN PATENT DOCUMENTS

| CN | 102289127 A | 12/2011 |
| CN | 102629064 A | 8/2012 |

(Continued)

OTHER PUBLICATIONS

Second Office Action issued in corresponding Chinese Application No. 201710953551.3, dated Apr. 14, 2020, with English translation.
(Continued)

*Primary Examiner* — Michael H Caley
*Assistant Examiner* — Jonathan Y Jung
(74) *Attorney, Agent, or Firm* — McDermott Will and Emery LLP

(57) ABSTRACT

A substrate includes a base, a first electrode provided on the base, and a plurality of transparent organic patterns provided on the first electrode. Part or whole of each of a plurality of color sub-pixel regions of the substrate does not overlap with a region where each of the plurality of the transparent organic patterns is located. Microcapsules are scattered in each of the plurality of transparent organic patterns, and each of the microcapsules includes a capsule shell and light-absorbing particles and light-reflecting particles which are moveable in the capsule shell. Moving directions of the light-absorbing particles are substantially opposite to moving directions of the light-reflecting particles under an action of an electric field having an electric field direction perpen-
(Continued)

dicular to the base, and the first electrode is included in electrodes forming the electric field.

20 Claims, 11 Drawing Sheets

(51) Int. Cl.
    *G02F 1/1335* (2006.01)
    *G02F 1/1362* (2006.01)

(52) U.S. Cl.
    CPC .. *G02F 1/133553* (2013.01); *G02F 1/136286* (2013.01); *G02F 1/134309* (2013.01); *G02F 1/167* (2013.01); *G02F 2001/134345* (2013.01); *G02F 2201/123* (2013.01); *G02F 2201/52* (2013.01); *G02F 2202/36* (2013.01); *G02F 2203/02* (2013.01); *G02F 2203/09* (2013.01); *G02F 2203/62* (2013.01)

(56) References Cited

U.S. PATENT DOCUMENTS

| | | | | |
|---|---|---|---|---|
| 2013/0114126 A1* | 5/2013 | Kim | ................... | G02F 1/16757 359/296 |
| 2013/0206316 A1 | 8/2013 | Liu | | |
| 2015/0077447 A1* | 3/2015 | Zhang | ................. | H01L 27/3213 345/694 |
| 2015/0213764 A1* | 7/2015 | Kitazawa | ............ | G02F 1/16757 345/694 |
| 2015/0309365 A1* | 10/2015 | Wang | ................. | G02F 1/13318 349/33 |
| 2017/0146860 A1 | 5/2017 | Ma | | |
| 2018/0188596 A1* | 7/2018 | Lo | ......................... | G02F 1/1368 |

FOREIGN PATENT DOCUMENTS

| | | |
|---|---|---|
| CN | 105044963 A | 11/2015 |
| CN | 105223726 A | 1/2016 |
| KR | 2011-0077265 A | 7/2011 |
| TW | 544940 B | 8/2003 |

OTHER PUBLICATIONS

First Office Action issued in corresponding Chinese Application No. 20171953551.3, dated Nov. 5, 2019.

\* cited by examiner

SUBSTRATE AND METHOD FOR MANUFACTURING THE SAME, DISPLAY PANEL AND DISPLAY DEVICE

CROSS-REFERENCE TO RELATED APPLICATION

This application claims priority to Chinese Patent Application No. 201710953551.3, filed on Oct. 13, 2017, titled "SUBSTRATE AND METHOD FOR MANUFACTURING THE SAME, DISPLAY PANEL AND DISPLAY DEVICE", which is incorporated herein by reference in its entirety.

TECHNICAL FIELD

The present disclosure relates to the field of display technologies, and more particularly to a substrate and a method for manufacturing the same, a display panel and a display device.

BACKGROUND

With the rapid development of the display industry, liquid crystal displays have been found in people's daily life, such as mobile phones, computers, televisions, watches, Pads, electronic labels, etc. In addition, with the gradually upgrading of functions of the mobile phones and the rapid development of smart wearable products, the demands for the outdoor readability of the displays have been increased, and thus reflective liquid crystal displays have been widely used and developed in recent years. At present, the reflective liquid crystal displays are used more and more widely due to their advantages of low power consumption, numerous display colors, and high resolution, etc.

SUMMARY

A first aspect provides a substrate, comprising: a base; a first electrode provided on the base; and a plurality of transparent organic patterns provided on a surface of the first electrode away from the base. Part or whole of each of a plurality of color sub-pixel regions of the substrate does not overlap with a region where each of the plurality of the transparent organic patterns is located, and microcapsules are scattered in each of the plurality of transparent organic patterns. Each of the microcapsules includes a capsule shell, and light-absorbing particles and light-reflecting particles which are moveable in the capsule shell, and moving directions of the light-absorbing particles are substantially opposite to moving directions of the light-reflecting particles under an action of an electric field that an electric field direction is perpendicular to a surface of the base on which the first electrode is provided. The first electrode is included in electrodes forming the electric field.

Optionally, the substrate is a substrate of a display panel at a display side.

Optionally, the display panel is a reflective display panel or a half-transmitting and half-reflecting display panel.

Optionally, the substrate is a color film substrate, and the color film substrate has brightening sub-pixel regions. The plurality of transparent organic patterns are located in the brightening sub-pixel regions respectively.

Optionally, the substrate is a color film substrate, each of the plurality of color sub-pixel regions comprises a color sub-region and a brightening sub-region, and the plurality of transparent organic patterns are located in brightening sub-regions of the plurality of color sub-pixel regions respectively.

Optionally, the light-absorbing particles are black particles, and the light-reflecting particles are white particles.

Optionally, each of the black particles comprises a carbon black particle, and/or, each of the white particles comprises a titanium dioxide particle.

A second aspect of the present disclosure provides a method for manufacturing the substrate according to the first aspect, comprising: forming a first electrode on a base; coating a transparent organic solution on the base on which the first electrode has been formed, and patterning the transparent organic solution to form a plurality of transparent organic patterns on the first electrode. Part or whole of each of a plurality of color sub-pixel regions of the substrate does not overlap with a region where each of the plurality of the transparent organic patterns is located. Microcapsules are scattered in each of the plurality of transparent organic patterns, and each of the microcapsules comprises a capsule shell, and light-absorbing particles and light-reflecting particles which are moveable in the capsule shell. Moving directions of the light-absorbing particles are substantially opposite to moving directions of the light-reflecting particles under an action of an electric field having an electric field direction perpendicular to a surface of the base on which the first electrode is provided, the first electrode is included in electrodes forming the electric field Optionally, the substrate is a substrate of a display panel at a display side.

Optionally, the display panel is a reflective display panel or a half-transmitting and half-reflecting display panel.

Optionally, the method further comprising: performing a pre-power-up process for the substrate on which the plurality of the transparent organic patterns have been formed, so that the light-reflecting particles are closer to a side of the capsule shell close to the base with respect to the light-absorbing particles in the microcapsule.

A third aspect of the present disclosure provides a display panel, comprising a first substrate and a second substrate provided opposite to each other, and a first electrode, a plurality of transparent organic patterns and a plurality of second electrodes arranged between the first substrate and the second substrate in sequence. Part or whole of each of a plurality of color sub-pixel regions of the display panel does not overlap with a region where each of the plurality of transparent organic patterns is located. Microcapsules are scattered in each of the plurality of transparent organic patterns, and each of the microcapsules comprises a capsule shell, and light-absorbing particles and light-reflecting particles which are moveable in the capsule shell. Moving directions of the light-absorbing particles are substantially opposite to moving directions of the light-reflecting particles under an action of an electric field formed by the first electrode and a corresponding one of the plurality of second electrodes, and the electric field is perpendicular to the first substrate.

Optionally, the display panel is a reflective display panel or a half-transmitting and half-reflecting display panel.

Optionally, the first substrate is a base of a color film substrate, the display panel has brightening sub-pixel regions, and the plurality of the transparent organic patterns are located in the brightening sub-pixel regions respectively.

Optionally, the first substrate is a base of a color film substrate, each of the plurality of color sub-pixel regions comprises a color sub-region and a brightening sub-region, and the plurality of the transparent organic patterns are located in brightening sub-regions of the plurality of color sub-pixel regions respectively.

Optionally, the first electrode is located on a side of the plurality of transparent organic patterns close to the first substrate, and each of the plurality of the second electrodes comprises a first pixel electrode located in a corresponding one of color sub-regions of the plurality of color sub-pixel regions and a second pixel electrode located in a corresponding one of the brightening sub-regions. The first pixel electrode and the second pixel electrode are driven by different data lines.

Optionally, the display panel is a reflective display panel. The first substrate is a base of the reflective display panel at a display side, and the reflective display panel further comprises a liquid crystal layer provided between the first substrate and the second substrate. The liquid crystal layer is not provided in regions, where the plurality of the transparent organic patterns are located, between the first substrate and the second substrate. Alternatively, the liquid crystal layer is located between the plurality of the transparent organic patterns and the second substrate. A thickness of the liquid crystal layer is less than a thickness of each of the plurality of the transparent organic patterns.

Optionally, the light-absorbing particles are black particles, and the light-reflecting particles are white particles.

A fourth aspect of the present disclosure provides a display device, comprising the display panel according to the third aspect.

Optionally, the display panel is a reflective display panel or a half-transmitting and half-reflecting display panel.

BRIEF DESCRIPTION OF THE DRAWINGS

FIG. 20 is a display schematic diagram of part of the reflective display panel shown in FIG. 17 in a color sub-pixel region when the panel is powered on;

DETAILED DESCRIPTION

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In related technologies, since a reflective liquid crystal display is not provided with a backlight unit and displays by reflecting ambient light, a reflectivity of the reflective liquid crystal display to the ambient light has an important influence on the display brightness of the display. However, the reflectivity of the reflective liquid crystal display is usually very low, and thus the display brightness is low. Usually, the reflectivity of the reflective liquid crystal display is improved by increasing a transmittance of a color film of the reflective liquid crystal display by reducing a thickness of a pigment of the color film. However, the reduction of the thickness of the pigment is limited due to the restriction of the production process of the color film, and thus the improvement of the reflectivity of the reflective liquid crystal display through this method is limited.

Regarding to the issues above, in related technologies, a reflective liquid crystal display having sub-pixel regions R, G, B, W (red, green, blue, white) is proposed. A color filter pattern is not provided in the sub-pixel region W, and thus the transmittance of the light passing through the sub-pixel region W will not be limited by the thickness of the pigment of the color film, so that the transmittance of light may be improved. Therefore, the reflectivity of the reflective liquid crystal display may be improved. However, the transmittance of the display with this structure is greatly affected by a luminous efficacy of the liquid crystals, generally about 50%, and thus the improvement of the transmittance of the color film is limited, so that the improvement of the reflectivity is limited.

Figure 1:
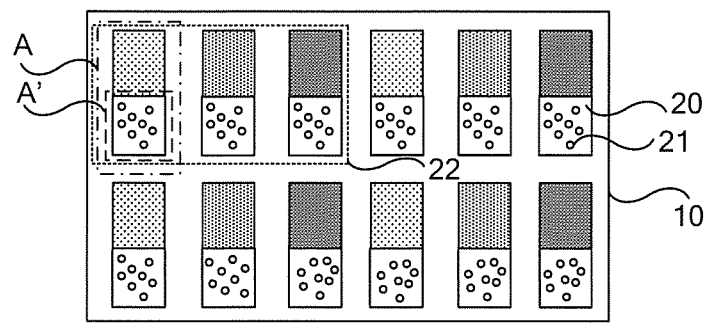
FIG. 1 is a schematic structure diagram of a substrate according to some embodiments of the present disclosure.
Figure 2:
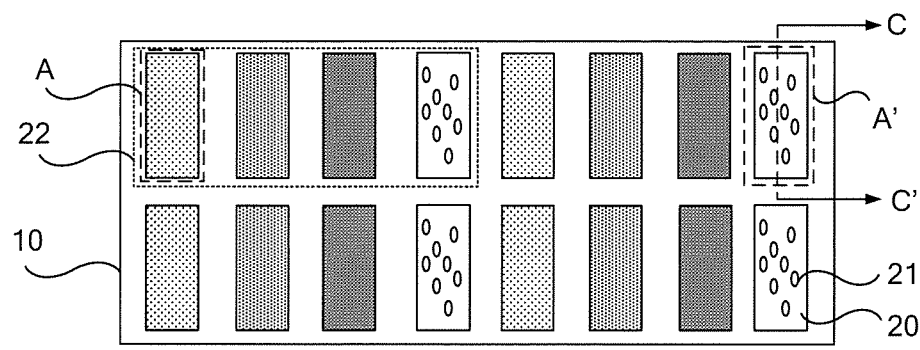
FIG. 2 is a schematic structure diagram of another substrate according to some embodiments of the present disclosure.

In response to the above problem, some embodiments of the present disclosure provide a substrate. As shown in FIGS. 1 and 2, the substrate has a plurality of color sub-pixel regions A. As shown in FIGS. 1, 2, 3 and 4, the substrate includes a base 10, a first electrode 30 (shown in FIG. 4) provided on the base 10, and a plurality of transparent organic patterns 20 provided on a surface of the first electrode 30 away from the base 10. As shown in FIG. 1, part of each of the plurality of the color sub-pixel regions A does not overlap with a region A' where each of the plurality of the transparent organic patterns 20 is located. Alternatively, as shown in FIG. 2, the whole of each of the plurality of the color sub-pixel regions A of the substrate do not overlap with a region A' where each of the plurality of the transparent organic patterns 20 is located.

Figure 3:
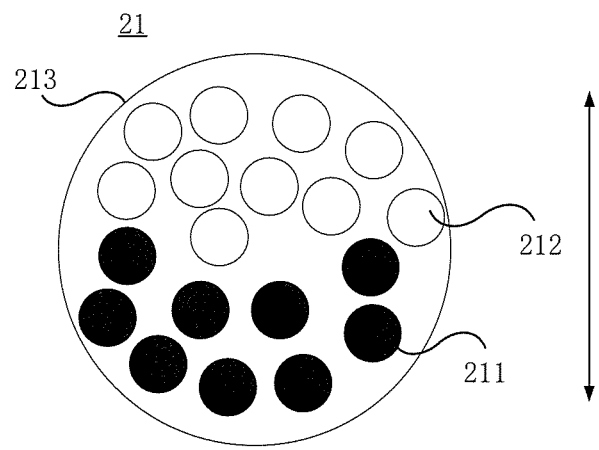
FIG. 3 is a schematic structure diagram of a microcapsule in the substrate shown in FIG. 1.

Microcapsules 21 are scattered in each of the plurality of transparent organic patterns 20. As shown in FIG. 3, each of the microcapsules 21 includes a capsule shell 213, and light-absorbing particles 211 and light-reflecting particles 212 which are moveable in the capsule shell 213. Moving directions of the light-absorbing particles 211 are substantially opposite to moving directions of the light-reflecting particles 212 under an action of an electric field having an electric field direction perpendicular to a surface of the base 10 on which the first electrode 30 is provided. For example, the light-absorbing particles 211 and the light-reflecting particles 212 move along the directions indicated by a double arrow shown in FIG. 3, respectively. The first electrode 30 is included in electrodes forming the electric field.

It will be noted that, each of the transparent organic patterns 20 is a transparent organic block. A pattern of each of the transparent organic patterns 20 is not limited in the present disclosure. For example, the pattern is a rectangular pattern shown in FIG. 1 or 2.

In some embodiments, the above-described substrate and an array substrate are cell-assembled to form a display panel. In some other embodiments, the above-described substrate is an array substrate, and is cell-assembled with another substrate to form a display panel.

In some embodiments, the above-described substrate is a substrate of a display panel at a display side. In some examples, the display panel is a reflective display panel or a half-transmitting and half-reflecting display panel, that is, a display panel for displaying by using a method including reflecting external ambient light.

The following embodiments are described by taking the display panel being the reflective display panel as an example.

In some embodiments, as shown in FIG. 1, the display panel has the plurality of the color sub-pixel regions A. In each of the plurality of the color sub-pixel regions A, the display panel includes structures such as a color filter layer, liquid crystals, and a driver electrode and a driver circuit for driving the liquid crystals to deflect, etc. Three color sub-pixel regions A of the plurality of color sub-pixel regions A constitute a pixel region 22. The three color sub-pixel regions A are for example a red color sub-pixel region, a green color sub-pixel region and a blue color sub-pixel region, respectively.

In some other embodiments, as shown in FIG. 2, the display panel has the plurality of the color sub-pixel regions A and a plurality of white sub-pixel regions A'.

In some examples, part of the color filter layer is not provided in the white sub-pixel regions A' to improve a transmittance of the color film layer of the reflective display panel. That is, the pixel region 22 includes three color sub-pixel regions A and a single white sub-pixel region A'. The three color sub-pixel regions A are for example a red color sub-pixel region, a green color sub-pixel region and a blue color sub-pixel region, respectively.

It will be noted that, the description that the substrate has the plurality of the color sub-pixel regions A does not mean that the substrate must include the above-described structures in the color sub-pixel regions, but means that the substrate has the regions corresponding to the plurality of the color sub-pixel regions A.

The structures of the substrate are not limited in the embodiments of the present disclosure, as long as the substrate and another substrate (such as an array substrate) are cell-assembled to form a display panel.

In some embodiments, the substrate is a cover plate which is cell-assembled with a COA (Color filter On Array) array substrate to form a display panel. In this case, the first electrode 30 of the cover plate is used to form a vertical electric field having an electrode (such as a pixel electrode) of the COA array substrate, and the light-absorbing particles 211 and the light-reflecting particles 212 move in the capsule shell 213 under an action of the vertical electric field.

In some other embodiments, the substrate is a color film substrate, and the first electrode 30 is, for example, a common electrode. In this case, the common electrode of the color film substrate and the electrode (such as a pixel electrode) of an array substrate form a vertical electric field, and the light-absorbing particles and the light-reflecting particles move in the capsule shell 213 under an action of the vertical electric field.

In the two cases, the moving directions of the light-absorbing partials 211 are the substantially opposite to the moving directions of the light-reflecting partials 212.

The description that part of each of the plurality of the color sub-pixel regions A does not overlap with the region A' where each of the plurality of the transparent organic pattern 20 is located means that in a thickness direction of the substrate, remaining part of each of the color sub-pixel regions A overlaps with a region A' where a corresponding one of the transparent organic patterns 20 is located. In this case, the region A' where the corresponding one of the transparent organic patterns 20 is located is part of a corresponding one of the color sub-pixel regions A shown in FIG. 1.

In some other embodiments, as shown in FIG. 2, the whole of each of the color sub-pixel region A does not overlap with the region A' where each of the transparent organic patterns 20 is located. In this case, the transparent organic patterns 20 are provided in achromatic color sub-pixel regions of the substrate respectively, and the achromatic color sub-pixel regions are for example the white sub-pixel regions.

It will be noted that, the reflectivity of the light-reflecting particles 212 is higher, and is much larger than the reflectivity of the liquid crystals in the reflective display panel. The reflectivity of the light-absorbing particles 211 is lower.

The light-reflecting particles 212 and the light-absorbing particles 211 are moveable in the capsule shell 213 under an action of the electrical field formed by the first electrode 30 and the electrode of the array substrate, and the moving directions of the light-reflecting particles 212 and the light-absorbing particles 211 are substantially opposite to each other. That is, the light-reflecting particles 212 and the light-absorbing particles 211 are conducting particles. In addition, materials of the light-reflecting particles 212 and the light-absorbing particles 211 are not limited in the present disclosure.

Based on this, when part of the display panel in the color sub-pixel regions A displays in a bright color state, the transparent organic patterns 20 that do not overlap with part or whole of each of the color sub-pixel regions A may improve the reflectivity of the display panel to external light, thereby improving the display brightness and the contrast ratio of the display panel.

In some embodiments, an electric field perpendicular to the base 10 is formed between an upper side and a lower side of the transparent organic pattern 20 by applying voltages to the first electrode 30 of the substrate and the electrode in the array substrate cell-assembled with the substrate, and the light-reflecting particles 212 are located on a side of the capsule shell 213 close to the base 10 with respect to the light-absorbing particles 211 under the action of the electric field. Since the reflectivity of the light-reflecting particles 212 is larger than the reflectivity of the liquid crystal layer, the external light incident into the regions A' where the transparent organic patterns 20 are located can be reflected by the light-reflecting particles 212 and then transmits at the display side, and then this region shows the color of the light-reflecting particles 212 (the color is for example the white color). Therefore, the brightness of the display panel is improved, thereby improving the reflectivity of the reflective display panel or the half-transmitting and half-reflecting display panel.

In addition, since the light reflected by the light-reflecting particles 212 does not need to pass through the liquid crystal layer in the display panel, the influence of the luminous efficacy of the liquid crystals on improving the reflectivity of the display panel is reduced, thereby significantly improving the brightness of the display panel when it displays in a bright state.

In addition, since part or whole of each of the color sub-pixel regions A does not overlap with the region A' where each of the transparent organic patterns 20 is located, the transparent organic pattern 20 will not affect the normal display of the reflective display panel while improving the reflectivity of the reflective display panel.

When the display panel displays in a dark state, the color sub-pixel regions A are in a dark state. An electric field perpendicular to the base 10 is formed between the upper side and the lower side of the transparent organic pattern 20 by applying voltages to the first electrode 30 and the electrode in a substrate cell-assembled with the aforementioned substrate, and the light-absorbing particles 211 are located at the side of the capsule shell 213 close to the base 10 with respect to the light-reflecting particles 212 under the action of the electric field. In this case, the external light incident into the region A' where the transparent organic patterns 20 are located can be absorbed by the light-absorbing particles 211, so that the reflectivity of the reflective display panel is significantly reduced when the panel displays in a dark state.

Since the substrate provided by the embodiments of the present disclosure increases the reflectivity of the reflective display panel or the half-transmitting and half-reflecting display panel when it displays in a bright state, and reduces the reflectivity when it displays in a dark state, the contrast ratio of the reflective display panel or the half-transmitting and half-reflecting display panel may be improved.

In some embodiments, the light-absorbing particles 211 are black particles, and the light-reflecting particles 212 are white particles to further improve the contrast ratio.

In some examples, the black particles include carbon black particles, the reflectivity of which is generally close to zero, and thus the carbon black particles can basically absorb all the light incident onto the carbon black particles. In some examples, the white particles include titanium dioxide particles, the reflectivity of which is several times than that of the liquid crystals, and thus the titanium dioxide particles can basically reflect all the light incident onto the titanium dioxide particles.

Figure 5:
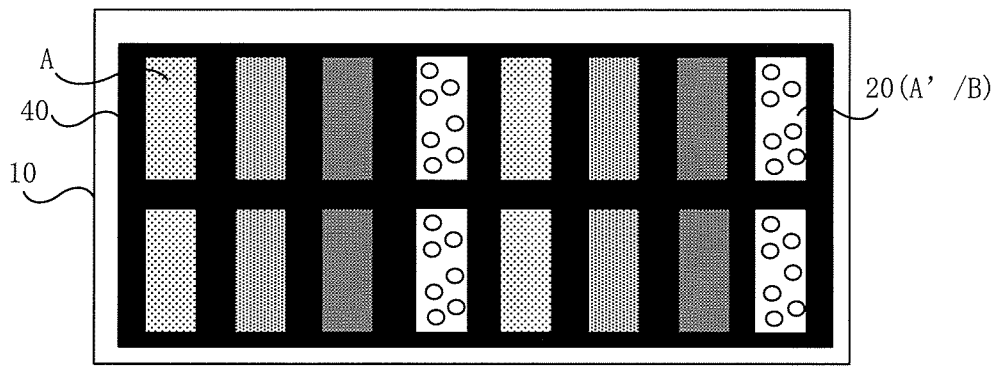
FIG. 5 is a schematic structure diagram of the substrate shown in FIG. 1 when it is a color film substrate.

The above-described substrate is for example a color film substrate, and the color film substrate includes brightening sub-pixel regions. As shown in FIG. 5, the transparent organic patterns 20 are located in the brightening sub-pixel regions B respectively. In this case, the whole of each of the color sub-pixel regions A do not overlap with the region A' where each of the transparent organic patterns 20 is located.

Figure 8A:
FIGS. 8a-8d are schematic diagrams showing successively a process for manufacturing the substrate shown in FIG. 5 when it is a color film substrate.

In some embodiments, as shown in FIG. 8a, the color film substrate further includes a black matrix 40 and a spacer layer (PS layer). The black matrix 40 is used to define the sub-pixel regions, and the spacer layer is used to maintain a fixed spacing between the two substrates in the display panel.

It will be noted that as shown in FIG. 5, the color film substrate includes the color sub-pixel regions A and the white sub-pixel regions, and each of the color sub-pixel regions A is for example the red sub-pixel region, the green sub-pixel region, or the blue sub-pixel region. In addition, the color filter pattern is not provided in the white sub-pixel regions. That is, the brightening sub-pixel regions B in some embodiments of the present disclosure may also be referred to as the aforementioned white sub-pixel regions.

When a conventional reflective display panel having sub-pixels RGBW displays an image, since the color filter pattern is not provided in the white sub-pixel regions, the transmittance of the color film in the color filter substrate can be improved, thereby improving the reflectivity of the reflective display panel. However, the light incident into the white sub-pixel regions needs to pass through the liquid crystal layer and then transmits from the display side after being reflected by the reflective electrode, so that the improvement of the reflectivity is still limited by the luminous efficacy of the liquid crystals.

Based on this, by using the substrate provided by the embodiments of the present disclosure to form the reflective display panel, when the reflective display panel displays in the bright state, the reflectivity of the reflective display panel in the bright state may be significantly improved since the light incident into the brightening sub-pixel region B is reflected by the light-reflecting particles 212 scattered in the microcapsule 21 in the transparent organic pattern 20.

When the reflective display panel displays in the dark state, the light incident into the brightening sub-pixel region B is absorbed by the light-absorbing particles 211 scattered in the microcapsule 21 in the transparent organic pattern 20, thereby reducing the reflectivity of the reflective display panel in the dark state. In this way, the light incident into the brightening sub-pixel region B is reflected by the light-reflecting particles without passing through the liquid crystal layer, thereby reducing the influence of the luminous efficacy of the liquid crystal on improving the reflectivity of the reflective display panel.

Based on this, a driving method of the reflective display panel with these structures is the same as that of the conventional reflective display panel having sub-pixels RGBW.

In some embodiments, each of the color sub-pixel regions A corresponds to a thin film transistor (TFT) which is used to drive the sub-pixel of a corresponding one of the sub-pixel regions. Gate signals for controlling the TFTs corresponding to the sub-pixel regions in the same row are the same. The data signals for controlling the TFTs corresponding to the brightening sub-pixel regions B are direct currents, and data signals for controlling the TFTs corresponding to the color sub-pixel regions A are alternating currents.

Figure 6:
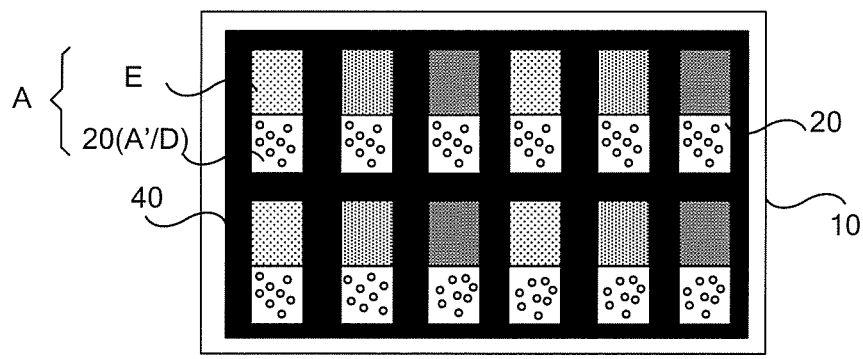
FIG. 6 is a schematic structure diagram of the substrate shown in FIG. 2 when it is a color film substrate.

When the substrate is a color film substrate shown in FIG. 6, that is, each of the color sub-pixel regions A includes a color sub-region E and a brightening sub-region D, the plurality of the transparent organic pattern 20 is located in brightening sub-regions D of the color sub-pixel regions A, respectively. At this time, part of each of the color sub-pixel regions A, i.e., the color sub-region E, does not overlap with the region A' where each of the transparent organic patterns 20 is located.

In this case, the principles, of the aforementioned substrate which constitutes the reflective display panel, for improving the reflectivity of the reflective display panel in the bright state and reducing the reflectivity of the reflective display panel in the dark state are the same as the principles of the substrate shown in FIG. 5, which will not be repeated.

In some embodiments, the color sub-pixel region A includes the color sub-region E and the brightening sub-region D, and when the reflective display panel having the aforementioned substrate is driven to display, the color sub-region E and the brightening sub-region D are driven in different driving methods.

The driving method of the display panel is described as follows. Part of the first electrode 30 in the brightening sub-region D and the electrode (for example, a pixel electrode in the array substrate) in the cell-assembled substrate are charged to form an electric field between the upper side and the lower side of the transparent organic pattern 20 and the direction of the electric field is perpendicular to the base 10. The light-absorbing particles 211 and the light-reflecting particles 212 in the microcapsule 21 are located in corresponding states under the action of the electric field. In addition, part of the first electrode in the color sub-region E is charged to control an arrangement of the liquid crystals. Therefore, the display of the display panel is achieved.

Figure 7:
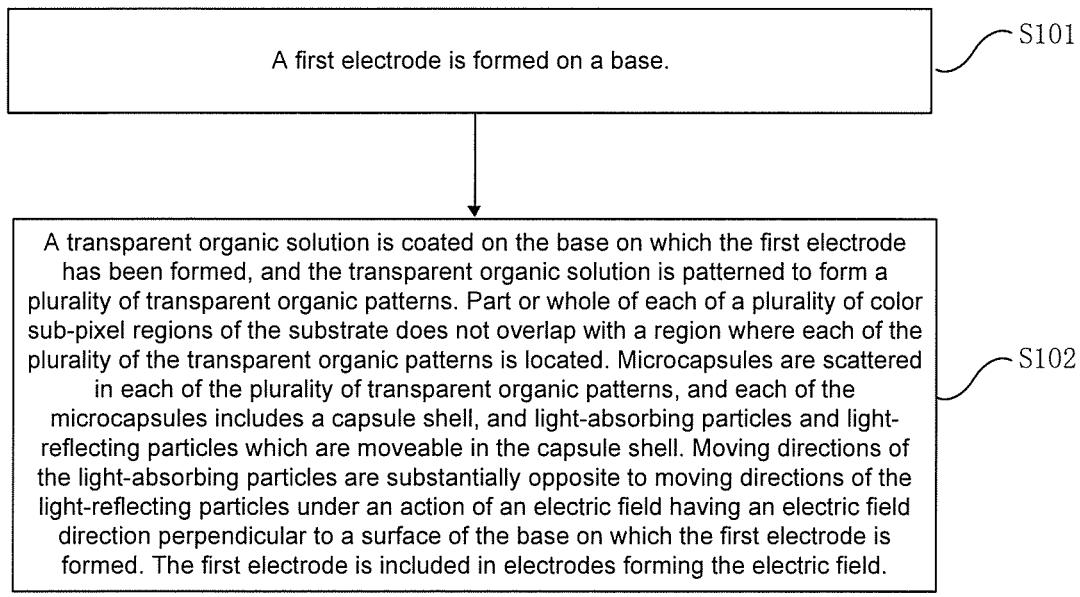
FIG. 7 is a flowchart of a method for manufacturing a substrate according to some embodiments of the present disclosure.

Some embodiments of the present disclosure provide a method for manufacturing a substrate, such as the aforementioned substrate in the above embodiments. The substrate is for example a substrate of a reflective display panel or a half-transmitting and half-reflecting display panel at a display side. As shown in FIG. 7, the method includes steps 101 and 102 (S101 and 102).

Figure 4:
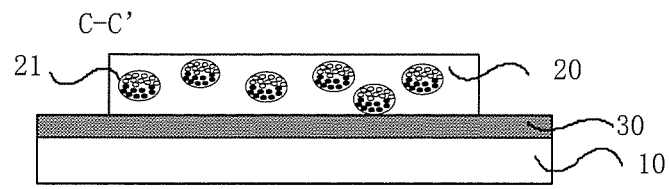
FIG. 4 is a schematic cross-section structure diagram of the substrate shown in FIG. 2 along a line C-C' of FIG. 2.

In S101, as shown in FIG. 4, a first electrode 30 is formed on a base 10.

In some embodiments, the first electrode 30 is a transparent electrode. In some examples, the transparent electrode is an indium tin oxide (ITO) electrode.

It will be noted that the structure of the base 10 is not limited in the present disclosure. In some embodiments, the base 10 is a glass base. In some other embodiments, the base 10 is a base having a color filter layer thereon.

In S102, a transparent organic solution is coated on the base 10 on which the first electrode 30 has been formed, and the transparent organic solution is patterned to form a plurality of transparent organic patterns 20 shown in FIG. 1 or 2. Part or whole of each of a plurality of color sub-pixel regions A of the substrate does not overlap with a region A where each of the plurality of the transparent organic patterns 20 is located.

Microcapsules 21 are scattered in each of the plurality of transparent organic patterns 20, and each of the microcapsules 21 includes a capsule shell 213, and light-absorbing particles 211 and light-reflecting particles 212 which are moveable in the capsule shell 213. Moving directions of the light-absorbing particles 211 are substantially opposite to moving directions of the light-reflecting particles 212 under an action of an electric field having an electric field direction perpendicular to a surface of the base 10 on which the first electrode 30 is formed. The first electrode 30 is included in electrodes forming the electric field.

In some embodiments, the substrate is for example a color film substrate, and the first electrode 30 serves as a common electrode of the color film substrate. At this time, an additional common electrode does not need to be formed.

In some other embodiments, the substrate is a cover plate, and the first electrode 30 is a newly provided electrode which is only used to realize the movement of the light-absorbing particles 211 relative to the light-reflecting particles 212 in the microcapsule 21 under the electric field perpendicular to the base 10.

In some embodiments, the transparent organic solution is formed by mixing the transparent organic solvent and the microcapsules 21 including the light-absorbing particles 211 and the light-reflecting particles 212.

In some embodiments, the light-absorbing particles 211 are black particles, and the light-reflecting particles 212 are white particles. In some examples, the black particles are black carbon black particles, and the white particles are white titanium dioxide particles.

In order to avoid purchasing new material to form the transparent organic solution, optionally, the material of the transparent organic solvent is the same as the material of an over coat (OC) layer of the color film substrate or a PS layer. In some examples, the material of the transparent organic solvent is a photoresist.

In addition, in some embodiments, before forming the transparent organic solution, the method further includes modifying the microcapsule 20. The light-reflecting particles 212 and the light-absorbing particles 211 are modified, so that the light-absorbing particles 211 and the light-reflecting particles 212 are easier to move in the capsule shell 213 under the action of the electric field. Therefore, the light-absorbing particles 211 and the light-reflecting particles 212 may reach their respective desired state as soon as possible.

It will be noted that the term "patterned" described above refers to a patterning process. The patterning process includes a photolithographic process, or includes other processes for forming predetermined patterns, such as a photolithographic process and an etching step, etc. The photolithographic process includes a film formation process, an exposure process, a development process, etc.

The photolithographic process is a process for forming the patterns by using the photoresist, a mask plate, and an exposure machine, etc.

Based on this, in the situation that the substrate is used as a substrate of the reflective display panel at the display side, when the reflective display panel displays in a bright state, the color sub-pixel regions A display in a bright state, and the transparent organic pattern 20 that does not overlap with part or whole of the color sub-pixel region A may improve the reflectivity to external light, thereby improving the display brightness of the reflective display panel.

In addition, an electric field perpendicular to the base 10 is formed between the upper side and the lower side of the transparent organic patterns 20 by applying voltages to the first electrode 30 and the electrode in the cell-assembled substrate cell-assembled with the substrate, and the light-reflecting particles 212 are located on the side of the capsule shell 213 close to the base 10 with respect to the light-absorbing particles 211 under the action of the electric field. In this case, the external light incident into the region A' where the transparent organic pattern 20 is located can transmit from the display side after being reflected by the light-reflecting particles 212 in the microcapsule 21, and the display panel displays white in this region, thereby improving the brightness of the reflective display panel.

Besides, since the reflectivity of the light-reflecting particles 212 is larger than the reflectivity of the liquid crystal layer, the reflectivity of the reflective display panel is improved. Since the light reflected by the light-reflecting particles 212 in the transparent organic pattern 20 does not need to pass through the liquid crystal layer in the reflective display panel, the influence of the luminous efficacy of the liquid crystals on improving the reflectivity of the reflective display panel is reduced, thereby significantly improving the brightness of the reflective display panel when it displays in a bright state.

In addition, since part or whole of the color sub-pixel region A does not overlap with the region where the transparent organic pattern 20 is located, the transparent organic pattern 20 will not affect the normal display of the reflective display panel while improving the reflectivity of the reflective display panel.

When the reflective display panel displays in a dark state, the color sub-pixel region A is in a dark state. An electric field perpendicular to the base 10 is formed between the upper side and the lower side of the transparent organic patterns 20 by applying voltages to the first electrode 30 and the electrode in the cell-assembled substrate cell-assembled with the substrate, and the light-absorbing particles 211 move to the side of the capsule shell 213 close to the base 10 with respect to the light-reflecting particles 212 under the action of the electric field. Therefore, the external light incident into the region A' where the transparent organic pattern 20 is located is directly absorbed by the light-absorbing particles 211 in the microcapsule 21, thereby significantly reducing the reflectivity of the reflective display panel when it displays in a dark state.

At the same time, since the substrate provided by the embodiments of the present disclosure improves the reflectivity of the reflective display panel when the panel displays in a bright state, and reduces the reflectivity of the reflective display panel when the panel displays in a dark state, the contrast ratio of the reflective display panel may be improved.

In some embodiments, the method further includes performing a pre-power-up process for the base 10 on which the transparent organic patterns 20 have been formed to make the light-reflecting particles 212 closer to a side of the capsule shell 213 close to the base 10 with respect to the light-absorbing particles 211 in the microcapsule 21.

It will be noted that, the pre-power-up process refers to that an external electric field is applied to the base 10 on which the transparent organic patterns 20 have been formed to make the light-reflecting particles 212 closer to a side of the capsule shell 213 close to the base 10 with respect to the light-absorbing particles 211 in each of the microcapsules 21 scattered in the transparent organic pattern 20.

In some embodiments, the reflective display panel is a TN-type panel. In the case that the TN-type panel is powered-off, the sub-pixel region where the transparent organic pattern 20 is located displays in a bright state. Since the light-reflecting particles 212 are located on the side of the capsule shell 213 close to the base 10 with respect to the light-absorbing particles 211, the light incident into the region A' where the transparent organic pattern 20 is located is directly reflected by the light-reflecting particles 212 without passing through the liquid crystal layer, thereby avoiding the influence of the luminous efficacy of the liquid crystals.

In this way, the reflectivity of the reflective display panel in a bright state may be improved in the case that the TN-type panel is powered-off. Meanwhile, since the reflectivity of the light-reflecting particles is higher than the reflectivity of the liquid crystal layer, the reflectivity of the region A' where the transparent organic pattern 20 is located is significantly improved, thereby improving the reflectivity of the reflective display panel in the bright state.

The methods for manufacturing the substrate shown in FIGS. 5 and 6 are described below, respectively.

In some embodiments, the substrate shown in FIG. 5 is the color film substrate, and the method includes steps 201-203 (S201-S203).

In S201, as shown in FIG. 8a, a black matrix 40 and a color filter layer 50 are formed on the base in sequence. The color filter layer 50 is located in the color sub-pixel regions A, and the color filter layer 50 is a red filter layer (R), a green filter layer (G) or a blue filter layer (B).

It will be noted that, the black matrix 40 has a grid-shape, and the regions where the meshes of the black matrix are located are the color sub-pixel regions A or the brightening sub-pixel regions B.

Optionally, the method further includes forming a planarization layer on the base 10 on which the color filter layer 50 has been formed, in order to flatten a surface of the structure including the base 10 and the color filter layer 50.

Figure 8B:
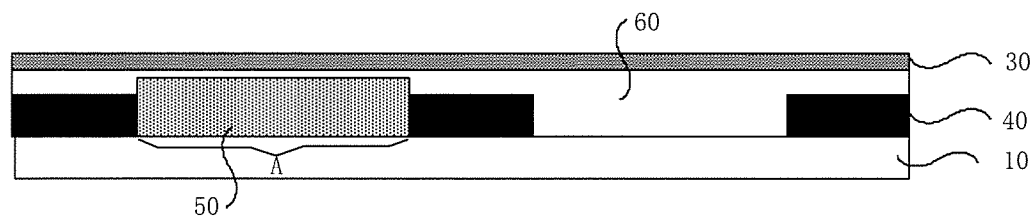

In S202, as shown in FIG. 8b, a protection layer 60 and a first electrode 30 are sequentially formed on the base 10 on which the color filter layer 50 has been formed.

Figure 8C:
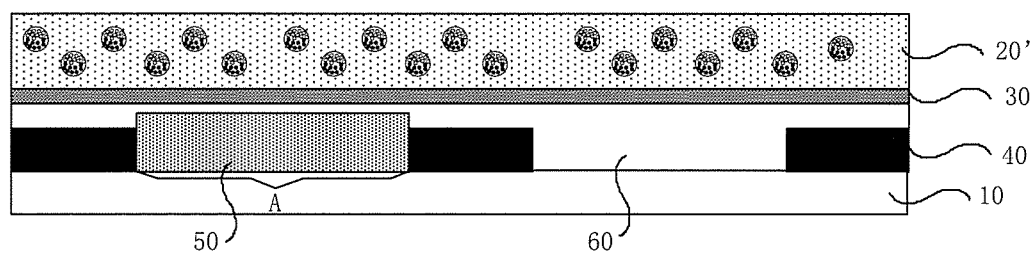
Figure 8D:
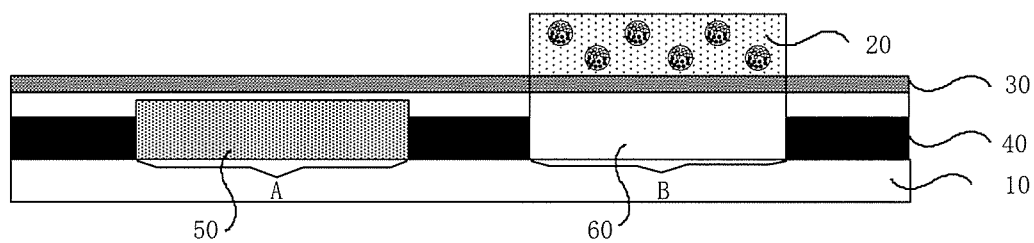

In S203, as shown in FIG. 8c, a transparent organic solution 20' is coated on the base 10 on which the first electrode 30 has been formed, and is then patterned, so that as shown in FIG. 8d, a plurality of transparent organic patterns 20 are formed in the brightening sub-pixel regions B, respectively.

In addition, microcapsules 21 are scattered in each of the plurality of transparent organic patterns 20, and each of the microcapsules 21 includes a capsule shell 213, and light-absorbing particles 211 and light-reflecting particles 212 which are moveable in the capsule shell 213. Moving directions of the light-absorbing particles 211 are substantially opposite to moving directions of the light-reflecting particles 212 under an action of an electric field having an electric field direction perpendicular to the base 10, and the first electrode 30 is included in electrodes forming the electric field.

In some embodiments, patterning the transparent organic solution 20' is performed by using the photoresist, the mask plate, an exposure machine, etc., and the transparent organic patterns are formed respectively in the brightening sub-pixel regions B by an exposure process, a development process, an etching process, etc.

Compared with the conventional reflective display panel having sub-pixels RGBW, the reflective display panel formed by the substrate made by the method may reduce the limit of the luminous efficacy of the liquid crystals, and improve the reflectivity of the reflective display panel.

In order to further avoid the influence of the luminous efficacy of the liquid crystals, optionally, a thickness of each of the transparent organic patterns 20 is approximately equal to a thickness of the liquid crystal layer in the reflective display panel.

In some embodiments, the thickness of the liquid crystal layer ranges from 1.5 μm to 5.0 μm, and thus the thickness of each of the transparent organic patterns 20 ranges from 1.5 μm to 5.0 μm. For example, the thickness of the transparent organic pattern 20 is 2.5 μm, 2.8 μm, 3.0 μm, 3.3 μm, 3.5 μm, etc.

In this way, in the reflective display panel formed by using the substrate with this structure, the influence of the luminous efficacy of the liquid crystals is completely avoided, since the liquid crystal layer is not provided in the brightening sub-pixel region B.

In some embodiments, the method further includes pre-forming pre-power-up process for the base 10 on which the transparent organic patterns 20 have been formed to make the light-reflecting particles 212 located on a side of capsule shell 213 closer to the base 10 with respect to the light-absorbing particles 211 in the microcapsule 21. Therefore, when the reflective display panel is formed by the substrate prepared by using the aforementioned method, the reflectivity of the reflective display panel in the bright state is improved in the case that the panel is powered off.

In some embodiments, the substrate shown in FIG. 6 is a color film substrate, and the method includes steps 301-303 (S301-S303).

Figure 9A:
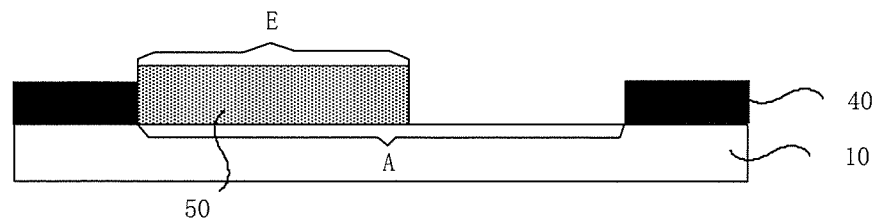
FIGS. 9a-9d are diagrams showing successively a process for manufacturing the substrate shown in FIG. 6 when it is a color film substrate.

In S301, as shown in FIG. 9a, a black matrix 40 is formed on the base 10, and a color filter layer 50 is formed on the base 10 in part of the color sub-pixel region A, i.e., the color sub-region E. The color filter layer 50 is a red filter layer, a green filter layer or a blue filter layer.

Figure 9B:
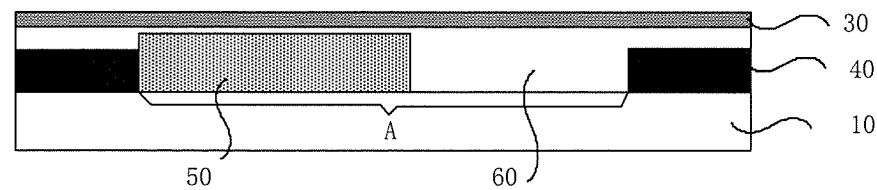

In S302, as shown in FIG. 9b, a protection layer 60 and a first electrode 30 are successively formed on the base 10 on which the color filter layer 50 has been formed.

Figure 9C:
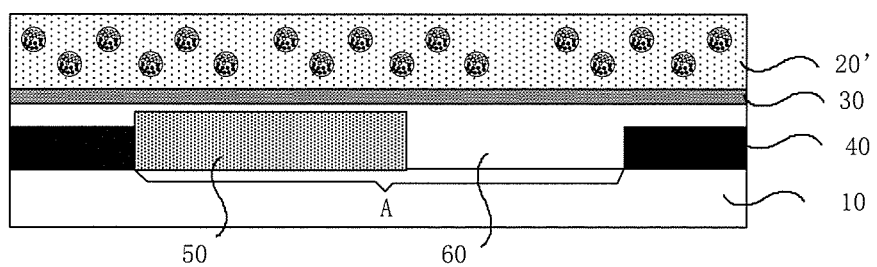
Figure 9D:
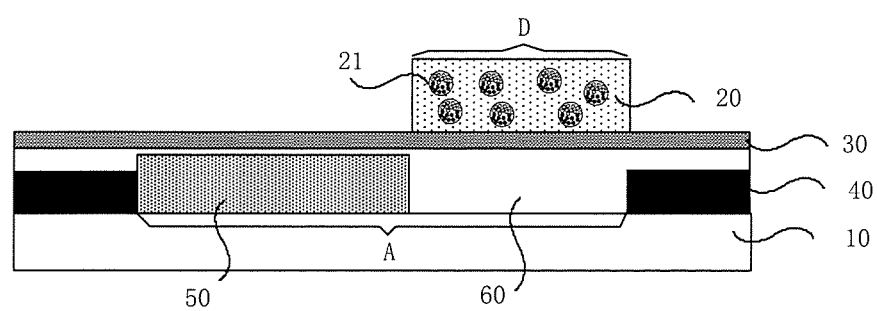

In S303, as shown in FIG. 9c, a transparent organic solution 20' is coated on the base 10 on which the first electrode 30 has been formed, and the transparent organic solution 20' is patterned to form a plurality of transparent organic patterns 20 in regions (i.e., the brightening sub-regions D) of the color sub-pixel regions A in which the color filter layers 50 are not formed.

Microcapsules 21 are scattered in each of the plurality of transparent organic patterns 20, and each of the microcapsules 21 includes a capsule shell 213, and light-absorbing particles 211 and light-reflecting particles 212 which are moveable in the capsule shell 213. The moving directions of the light-absorbing particles 211 are substantially opposite to the moving directions of the light-reflecting particles 212 under an action of an electric field having an electric field direction perpendicular to the base 10, and the first electrode 30 is included in electrodes forming the electric field.

In some embodiments, the method further includes pre-forming a pre-power-up process for the base 10 on which the transparent organic patterns 20 have been formed to make the light-reflecting particles 212 locate on a side of the capsule shell 213 close to the base 10 with respect to the light-absorbing particles 211 in the microcapsule 21.

In some embodiments, the thickness of each of the transparent organic patterns 20 is approximately equal to the thickness of the liquid crystal layer in the reflective display panel, so that when the substrate and the array substrate are cell-assembled to form the reflective display panel, the influence of the luminous efficacy of the liquid crystals on improving the reflectivity in the bright state by the light-reflecting particles 212 and reducing the reflectivity in the dark state by the light-absorbing particles 211 is avoided.

Since each of the sub-pixel regions of the substrate as shown in FIG. 6 includes two parts, when the reflective display panel formed by using the substrate displays an image, it is necessary to drive the liquid crystal layer in the color sub-regions E to deflect to realize the display of the panel, and drive the light-reflecting particles 212 and the light-absorbing particles 211 in the microcapsules 21 scattered in the transparent organic pattern 20 in the brightening sub-region D to reach the corresponding positions, thereby improving the reflectivity of the reflective display panel in the bright state or reducing the reflectivity of the reflective display panel in the dark state, improving the contrast ratio of the reflective display panel. Therefore, the brightening sub-regions D and the color sub-regions E need to be driven separately.

Figure 10:
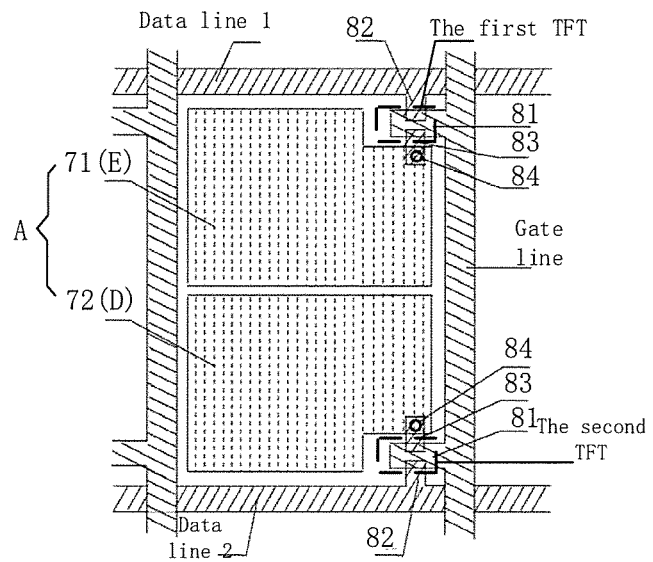
FIG. 10 is a schematic structure diagram of a color sub-pixel unit of an array substrate according to some embodiments of the present disclosure.

In order to achieve above object, some embodiments of the present disclosure provide an array substrate, and the array substrate has a plurality of color sub-pixel regions A. FIG. 10 is a diagram of a color sub-pixel region A in the array substrate, and the color sub-pixel region A includes a color sub-region E and a brightening sub-region D. The array substrate includes a first pixel electrodes 71 located in the color sub-region E and a second pixel electrodes 72 located in the brightening sub-region D, and the first pixel electrode 71 and the second pixel electrode 72 are driven by different data lines.

Based on this, in the reflective display panel formed by cell-assembling the substrate shown in FIG. 6 with the array substrate, gate electrodes of TFTs located in the color sub-region E and the brightening sub-region D share a gate line to transmit scanning signals, or use different gate lines to transmit scanning signals. The first pixel electrode 71 and the second pixel electrode 72 are connected to different data lines.

In this way, the liquid crystal layer in the color sub-region E and the microcapsules 20 in the brightening sub-region D can be driven separately to improve the reflectivity of the reflective display panel when it displays in a bright state or reduce the reflectivity of the reflective display panel when it displays in a dark state.

In some embodiments, as shown in FIG. 10, the array substrate further includes a first TFT for driving part of the liquid crystal layer in the color sub-region E, a second TFT for driving the light-reflecting particles 212 and the light-absorbing particles 211 in the microcapsule 20 in the brightening sub-region D, and a gate line and a data line. Each of the first and second TFTs includes a gate electrode 81, a source electrode 82 and a drain electrode 83, and the drain electrodes 83 of the TFTs is connected with the first pixel electrode 71 and the second pixel electrode 72 through via holes 84 respectively.

The method for connecting the data line with the first pixel electrode 71 and the second pixel electrode 72 will be illustrated below.

For example, as shown in FIG. 10, the gate electrodes 81 of the first and the second TFTs share one gate line, the source electrode 82 of the first TFT is connected with a data line 1, and the source electrode 82 of the second TFT is connected with a data line 2. That is, the first pixel electrode 71 and the second pixel electrode 72 are driven by different data lines.

In this case, when the reflective display panel formed by the array substrate and the color film substrate is powered on, a scanning signal is input to the gate electrodes 81 of the first TFT and the second TFT, and data signals are input to the first pixel electrode 71 and the second pixel electrode 72 via the drain electrodes 82 of the first TFT and the second TFT respectively, so that the light-reflecting particles 212 and the light-absorbing particles 211 scattered in the microcapsules 21 in the transparent organic pattern 20 in the brightening sub-region D reach their respective positions under an action of the electric field formed by the first pixel electrode 71 and the first electrode 30, and that the liquid crystal layer in the color sub-region E is driven to deflect under the action of an electric field formed by the second pixel electrode 72 and the first electrode 30 so as to achieve the display of the panel.

Since only the light-reflecting particles 212 and the light-absorbing particles 211 of the brightening sub-region D need to be controlled to reach their respective positions in the display process, a data signal of the first pixel electrode 71 corresponding to the light-reflecting particles 212 and the light-absorbing particles 211 is a direct current signal, while a data signal of the second pixel electrode 72 corresponding to the liquid crystal layer is an alternating current signal.

Furthermore, in some embodiments, when the light-reflecting particles 212 and the light-absorbing particles 211 are at their respective states in the display process, the direct current signal is stopped from inputting to the data line of the first pixel electrode 71 corresponding to the light-reflecting particles 212 and the light-absorbing particles 211 to reduce the power consumption.

Figure 11:
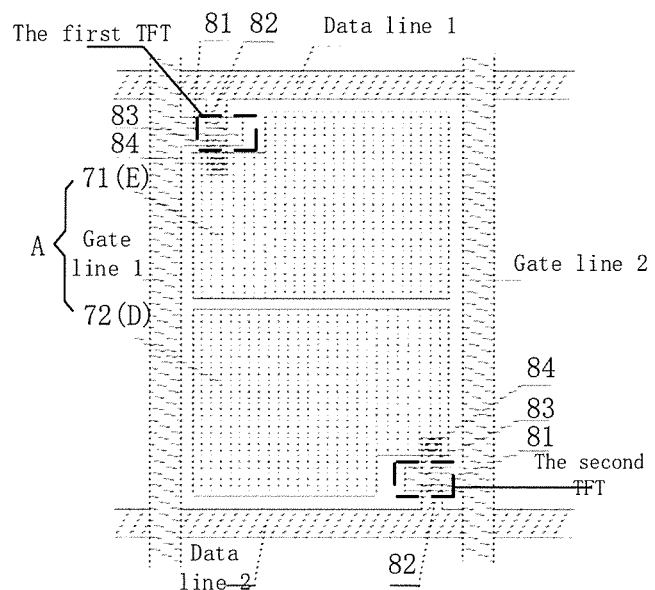
FIG. 11 is a schematic structure diagram of a color sub-pixel unit of another array substrate according to some embodiments of the present disclosure.
Figure 12:
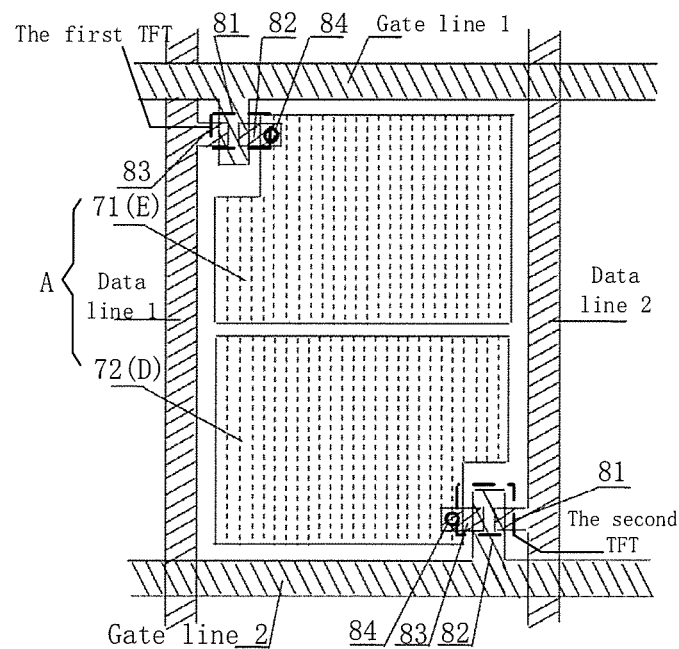
FIG. 12 is a schematic structure diagram of a color sub-pixel unit of yet another array substrate according to some embodiments of the present disclosure.

In some other embodiments, as shown in FIG. 11 or 12, the gate electrode 81 of the first TFT is connected with a gate line 1, the gate electrode 81 of the second TFT is connected with a gate line 2, the source electrode 82 of the first TFT is connected with a data line 1, and the source electrode 82 of the second TFT is connected with a data line 2, so that the first pixel electrode 71 and the second pixel electrode 72 are driven by different data lines.

Figure 13:
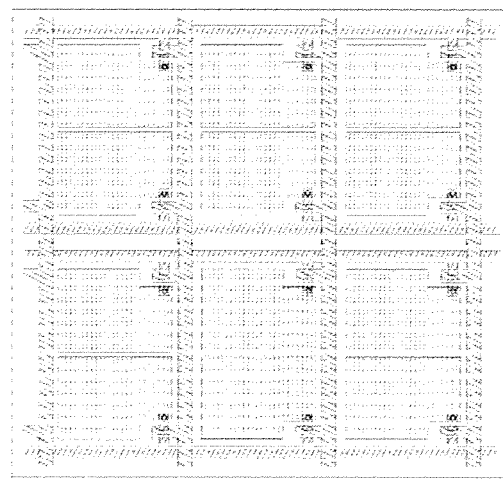
FIG. 13 is a plane structure diagram of an array substrate including a plurality of the color sub-pixel units shown in FIG. 10.
Figure 14:
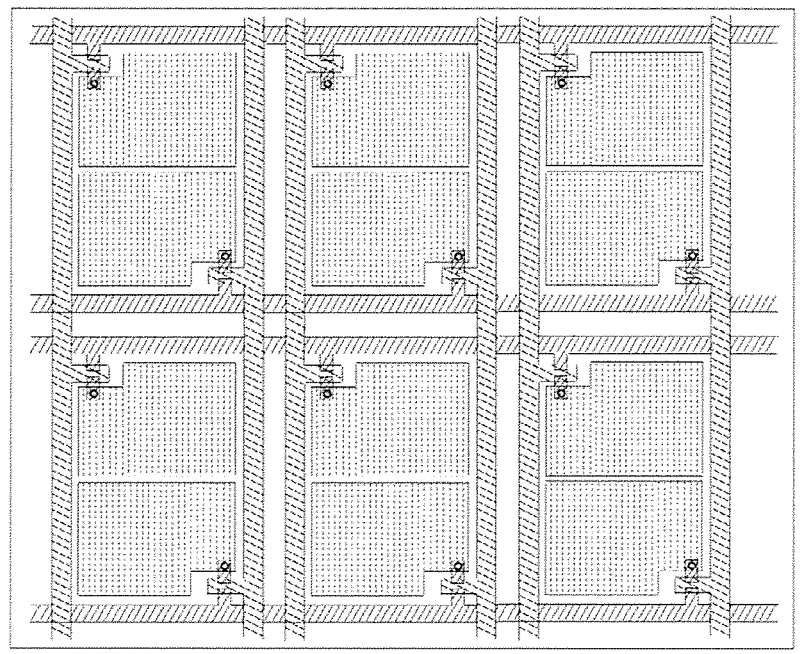
FIG. 14 is a plane structure diagram of an array substrate including a plurality of the color sub-pixel units shown in FIG. 11.
Figure 15:
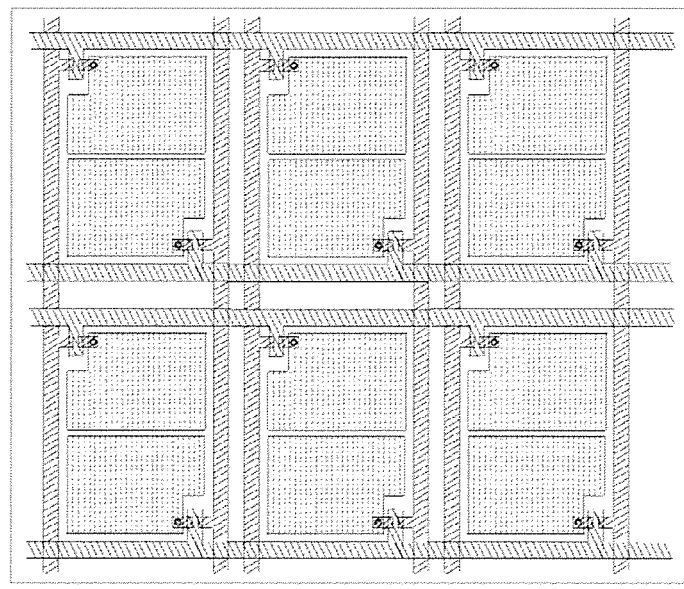
FIG. 15 is a plane structure diagram of an array substrate including a plurality of the color sub-pixel units shown in FIG. 12.

FIG. 13 is a plane structure diagram of an array substrate having the plurality of the color sub-pixel regions A shown in FIG. 10, FIG. 14 is a plane structure diagram of an array substrate having the plurality of the color sub-pixel regions A shown in FIG. 11, and FIG. 15 is a plane structure diagram of an array substrate having the plurality of the color sub-pixel regions A shown in FIG. 12.

In some embodiments, the light-reflecting particles 212 and the light-absorbing particles 211 scattered in each of the microcapsules 21 in the transparent organic pattern 20 in the brightening sub-region D are charged by the first TFT, and the liquid crystal layer in the color sub-region E is charged by the second TFT.

It will be noted that the setting positions of the gate line and the data line in the color sub-pixel region A are not limited in the present disclosure. In some embodiments, as shown in FIG. 10 or 11, when the gate line is located on the left or right side of the first pixel electrode 71 (or the second pixel electrode 72), the data lines used to provide the data signals to the color sub-region E and the brightening sub-region D are located on the upper and lower sides of the first pixel electrode 71 (or the second pixel electrode 72), respectively.

In some other embodiments, as shown in FIG. 12, when the gate line is located on the upper side or lower side of the first pixel electrode 71 (or the second pixel electrode 72), the data line 1 and the data line 2 are located on the left and right sides of the first pixel electrode 71 (or the second pixel electrode 72), respectively.

Figure 22:
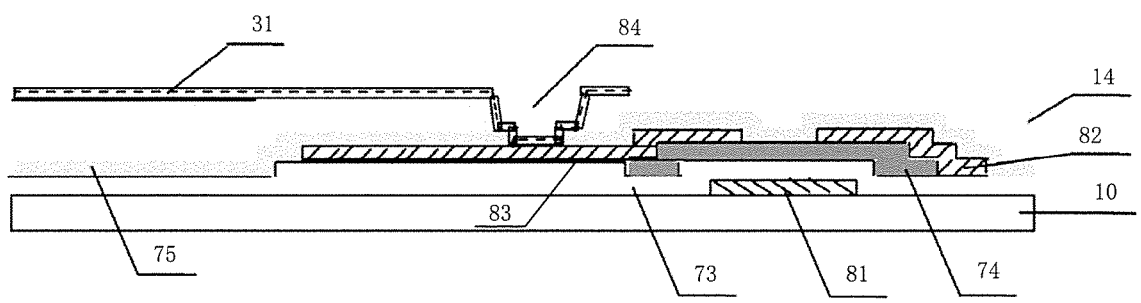
FIG. 22 is a layer structure diagram of an array substrate according to some embodiments of the present disclosure.

In some embodiments, the process for manufacturing the array substrate provided by the embodiments of the present disclosure is substantially the same as that of the conventional array substrate. For example, as shown in FIG. 22, the gate electrode 81, a gate insulating layer 73, an active layer 74, the source electrode 82, the drain electrode 83, an insulating layer 75, a resin layer 14, and the second electrode 31 are successively formed on the base 10 through patterning processes, and the second electrode 31 and the drain electrode 83 are electrically connected through the via hole 84.

Based on this, when a reflective display device is formed by cell-assembling the array substrate shown in any one of FIGS. 11-15 with the substrate (taking the substrate being a color film substrate as an example) shown in FIG. 6, a sealant is uniformly coated on the color film substrate at a specified position, and then the liquid crystals are dropped onto the array substrate. Finally, the array substrate on which the liquid crystals have been dropped is cell-assembled with the substrate on which the sealant has been coated, and then the sealant is cured through UV-polymerization or thermal polymerization, thereby forming the reflective display device.

Here, It is known to those skilled in the art that the process that the sealant is uniformly coated on the color film substrate at a specified position should be protected from light.

Figure 16:
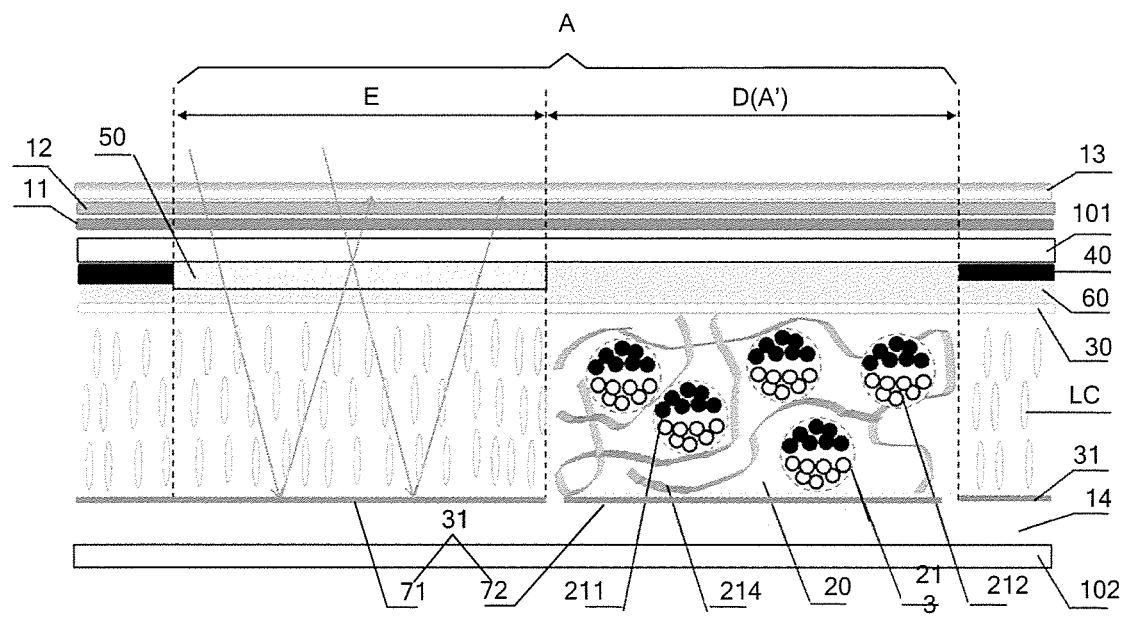
FIG. 16 is a structure diagram of a color sub-pixel region of a reflective display panel according to some embodiments of the present disclosure.
Figure 17:
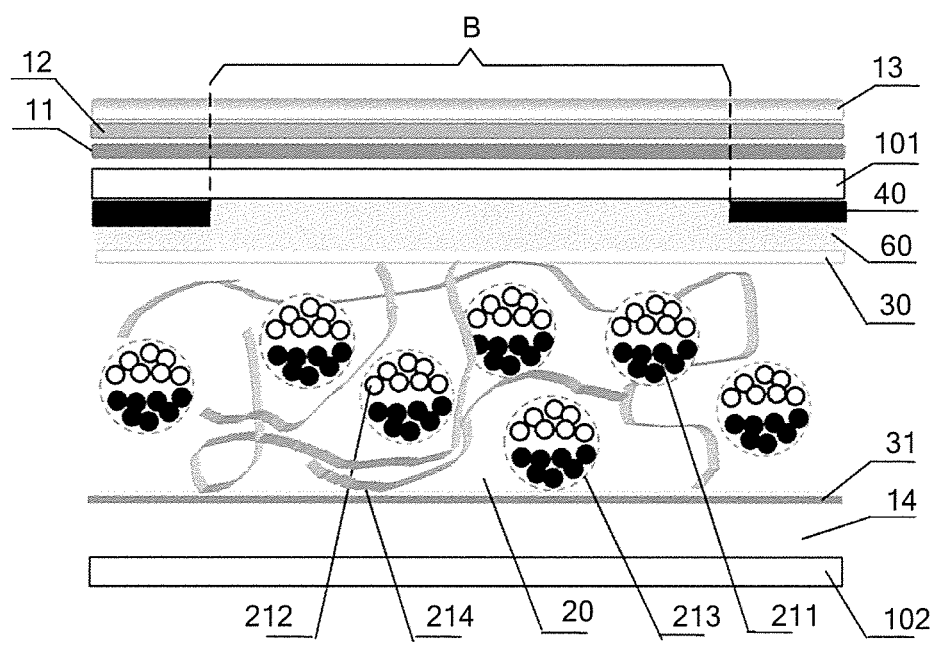
FIG. 17 is a structure diagram of a color sub-pixel region of another reflective display panel according to some embodiments of the present disclosure.

Some embodiments of the present disclosure provide a display panel. As shown in FIGS. 16 and 17, the display panel includes a first substrate 101 and a second substrate 102 provided opposite to each other. The display panel further includes a first electrode 30, a plurality of transparent organic patterns 20 and a plurality of second electrodes 31 sequentially provided between the first substrate 101 and the second substrate 102. As shown in FIG. 16, part of each of the plurality of the color sub-pixel regions A of the display panel does not overlap with a region B where each of the plurality of the transparent organic patterns 20 is located. Alternatively, as shown in FIG. 17, the whole of each of the plurality of the color sub-pixel region A of the display panel does not overlap with a region B where each of the plurality of the transparent organic patterns 20 is located.

Microcapsules 21 are scattered in each of the plurality of transparent organic patterns 20, and each of the microcapsules 21 includes a capsule shell 213, and light-absorbing particles 211 and light-reflecting particles 212 which are moveable in the capsule shell 213. Moving directions of the light-absorbing particles 211 are substantially opposite to moving directions of the light-reflecting particles 212 under an action of an electric field perpendicular to the first substrate and formed by the first electrode 30 and the second electrode 31.

In some embodiments, the aforementioned display panel is a reflective display panel or a half-transmitting and half-reflecting display panel having a reflection display effect. The first substrate 101 is for example a base of the display panel at a display side.

The following embodiments will be described by taking the display panel being the reflective display panel as an example.

In some embodiments, the second electrodes 31 are used as pixel electrodes in the reflective display panel for driving the liquid crystal (LC) to deflect, and the pixel electrodes are reflective electrodes to reflect external light, thereby realizing display.

Optionally, the reflective electrodes are formed of metal with higher reflectivity, such as Al, Ag, to ensure the effect of the reflection to the external light.

In some embodiments, the first substrate 101 is a cover plate in a COA display device. In some other embodiments, the first substrate 101 is a base in a color film substrate. The second substrate 102 is a base of an array substrate.

Since the light-reflecting particles 212 reflect the external light without being affected by the luminous efficacy of the liquid crystals, the reflectivity of the reflective display panel is improved. Therefore, the second electrodes 31 respectively corresponding to the regions B where the transparent organic pattern 20 are located are for example transparent electrodes such as ITO electrodes, as the second electrodes 31 are not required to reflect the light.

In this way, compared with the situation that the second electrodes 31 corresponding to the color sub-pixel regions A are all electrodes having reflective functions, when some of the second electrodes 31 are the transparent electrodes, the production cost of the reflective display panel may be reduced.

In addition, the above embodiments of the present disclosure is described by taking the first electrode being located on a side of the plurality of transparent organic patterns close to the first substrate as an example.

Based on this, when the reflective display panel displays in a bright state, the color sub-pixel region A displays in a bright state, and the transparent organic pattern 20 which does not overlap with part or whole of the color sub-pixel region A can improve the reflectivity to external light, thereby improving the display brightness.

An electric field perpendicular to the first substrate is formed between the upper side and the lower side of the transparent organic patterns 20 by applying voltages to the first electrode 30 and the second electrode 31, and the light-reflecting particles 212 are located on the side of the capsule shell 213 close to the first substrate with respect to the light-absorbing particles 211 under the action of the electric field, so that the external light incident into the region A' where the transparent organic pattern 20 is located can transmit from the display side after directly being reflected by the light-reflecting particles 212 in the microcapsule 21. Therefore, part of the display panel in this region displays the color of the light-reflecting particles 212 (the color is for example the white color), thereby improving the brightness of the reflective display panel.

Since the reflectivity of the light-reflecting particles is higher than the reflectivity of the liquid crystal layer, the reflectivity of reflective display panel is significantly improved.

In addition, Since the light reflected by the light-reflecting particles 212 in the transparent organic patterns 20 does not need to pass through the liquid crystal layer in the reflective display panel, the influence of the luminous efficacy of the liquid crystals on improving the reflectivity of the display panel is reduced, thereby significantly improving the brightness of the reflective display panel when it displays in a bright state.

Furthermore, since part or whole of the color sub-pixel region A does not overlap with the region A' where the transparent organic pattern 20 is located, the transparent organic pattern 20 will not affect the normal display while improving the reflectivity of the reflective display panel.

When the reflective display panel displays in a dark state, the color sub-pixel region A is in a dark state. In this case, an electric field perpendicular to the first substrate is formed between the upper side and the lower side of the transparent organic patterns 20 by applying voltages to the first electrode 30 and the second electrode 31, and the light-absorbing particles 211 are located on a side of the capsule shell 213 close to the first substrate 101 with respect to the light-reflecting particles 212 under the action of the electric field, so that the external light incident into the region A' where the transparent organic pattern 20 is located can be absorbed by the light-absorbing particles 211 in the microcapsule 21, thereby significantly reducing the reflectivity of the reflective display panel when it displays in a dark state.

Since the reflectivity of the reflective display panel provided by the embodiments of the present disclosure is improved when the panel displays in a bright state, and the reflectivity of the panel is reduced when it displays in a dark state, thereby improving the contrast ratio of the reflective display panel.

In some embodiments, the first substrate 101 is the base of the color film substrate, and as shown in FIGS. 16 and 17, the reflective display panel further includes a black matrix 40, a color filter layer 50 and a protection layer 60 which are located on a side of the first substrate 101. In addition, the reflective display panel includes a quarter wave plate 11, a half wave plate 12 and an upper polarizer 13 which are successively located on an opposite side of the first substrate 101. In some embodiments, the second substrate 102 is a base of the array substrate, and the reflective display panel further includes a resin layer 14 located on the second substrate 102. The above structures are all conventional structures of the reflective display panel, and the functions thereof in the reflective display panel provided by the embodiments of the present disclosure are the same as those in the conventional display panel, which are not repeated herein.

In order to better scatter the microcapsules 21 in the transparent organic pattern 20, as shown in FIG. 16, in some embodiments, the transparent organic pattern 20 further includes polymers 214 in the transparent organic solution, and the polymers 214 are formed by polymerizing the polymerizable monomers.

The arrangement position of the transparent organic pattern 20 in the reflective display panel will be illustrated below.

For example, as shown in FIG. 17, the reflective display panel further includes a brightening sub-pixel region B, and the transparent organic pattern 20 is located in the brightening sub-pixel region B. At this time, the whole of the color sub-pixel regions A do not overlap with the region A' where the transparent organic pattern 20 is located.

Base on this, when the reflective display panel is prepared, the light-reflecting particles 212 can be close to the display side with respect to the light-absorbing particles 211 by a method of pre-power-up process.

The working principle of the reflective display panel shown in FIG. 16 when it is a TN-type panel is illustrated below.

Figure 19:
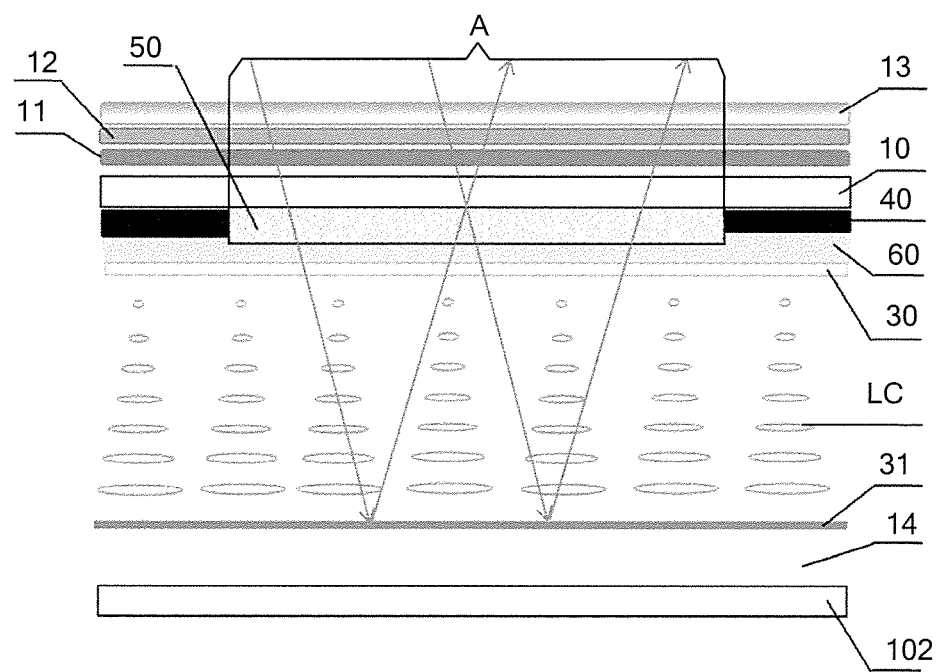
FIG. 19 is a display schematic diagram of part of the reflective display panel shown in FIG. 17 in a color sub-pixel region when the panel is powered off.

When the display panel is powered off, the liquid crystals in the color sub-pixel region A are arranged in a TN-type. As shown in FIG. 19, the light reflected by the second electrode 31 can transmit from the upper polarizer 13 after passing through the liquid crystal layer, and the color sub-pixel region A is in the bright state.

Since as shown in FIG. 17, the light-reflecting particles 212 in the microcapsule 21 in the transparent organic pattern 20 are located at the display side when the display panel is powered off, the light-reflecting particles 212 can directly reflect the external light, so that the region A' where the transparent organic pattern is located, i.e., the brightening sub-pixel region B, is white, thereby avoiding the influence of the luminous efficacy of the liquid crystals on improving the reflectivity, meanwhile, improving the brightness in the bright state.

In addition, since the reflectivity of the light-reflecting particles 212 is higher than the reflectivity of the liquid crystal layer, the influence of the luminous efficacy of the liquid crystals on improving the reflectivity is avoided, and the reflectivity of reflective display panel can be significantly improved.

Figure 20:
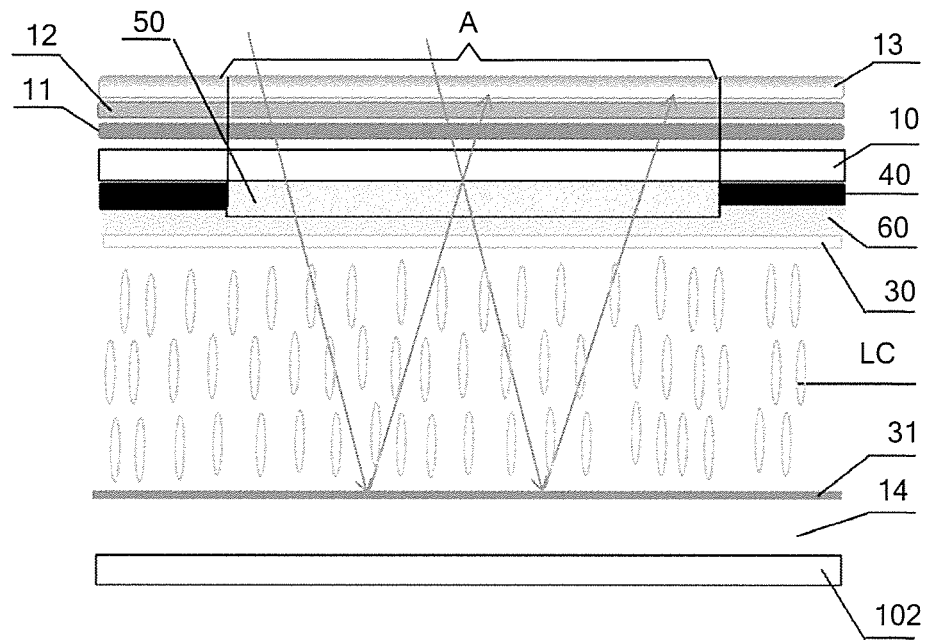
Figure 21:
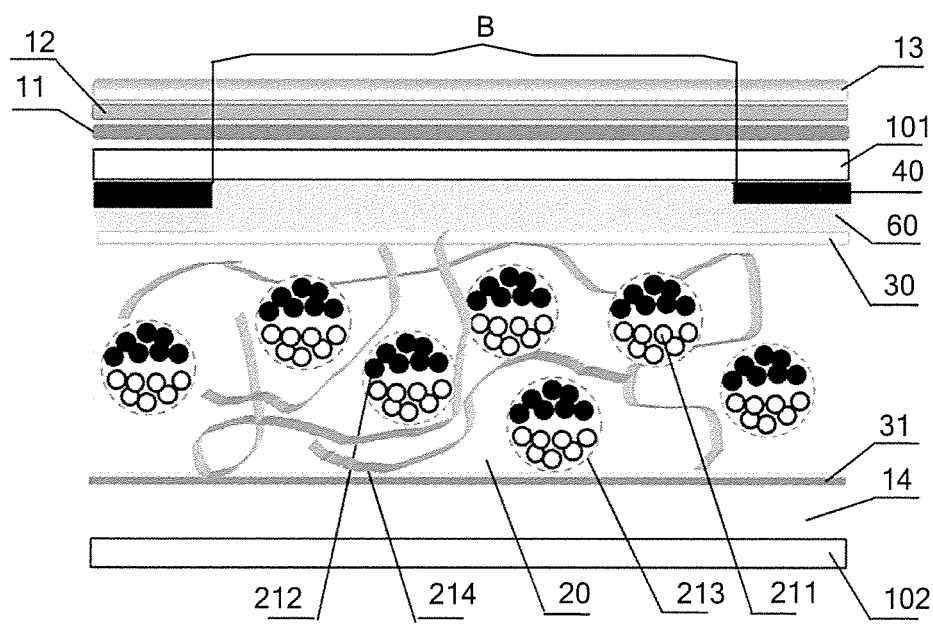
FIG. 21 is a display schematic diagram of part of the reflective display panel shown in FIG. 17 in a brightening sub-pixel region when the panel displays in a bright state.

When the reflective display panel is powered on, as shown in FIG. 20, the liquid crystals are vertically arranged under the action of the electric field, and the light reflected by the second electrode 31 cannot pass through the upper polarizer 13. At this time, the color sub-pixel region A is in a dark state. Voltages are applied to the second electrode 31 corresponding to the brightening sub-pixel region B and the first electrode 30, and an electric field perpendicular to the first substrate is formed. As shown in FIG. 21, the light-absorbing particles 211 are close to the display side with respect to the light-reflecting particles 212 under the action of the electric field, and the brightening sub-pixel region B is in the dark state. In this way, the reflectivity of the reflective display panel in the dark state is reduced, thereby improving the contrast ratio of the reflective display panel.

A data signal for controlling the brightening sub-region D is for example a direct current signal, and a data signal for controlling the color sub-region E is for example an alternating current signal.

Alternatively, as shown in FIG. 16, the color sub-pixel region A includes the color sub-region E and the brightening sub-region D, and the transparent organic pattern 20 is located in the brightening sub-region D. At this time, part of the color sub-pixel region A does not overlap with the region A' where the transparent organic pattern 20 is located.

Based on this, when the reflective display panel is prepared, the light-reflecting particles 212 can be close to the display side with respect to the light-absorbing particles 211 by a method of pre-power-up process.

Based on this, in some embodiments, as shown in FIG. 16, the second electrode 31 includes a first pixel electrode 71 located in the color sub-region E and a second pixel electrode 72 located in the brightening sub-region D, and the first pixel electrode 71 and the second pixel electrode 72 are driven by different data lines.

The working principle of the reflective display panel shown in FIG. 17 when it is a TN-type panel is illustrated.

Figure 18:
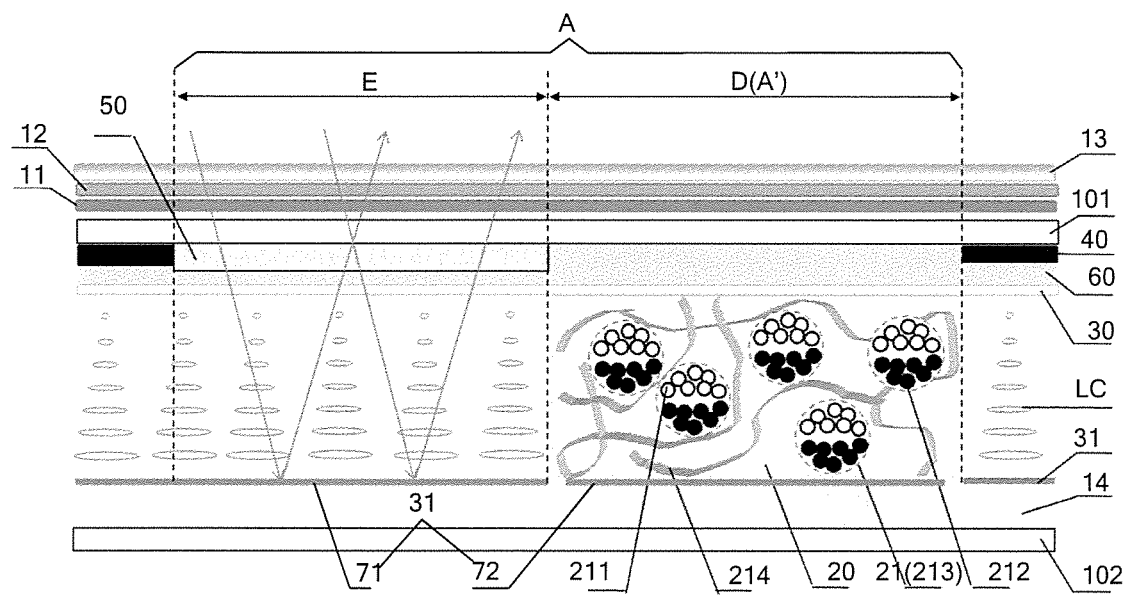
FIG. 18 is a display schematic diagram of the reflective display panel shown in FIG. 16 when it is powered off.

When the reflective display panel is powered off, the liquid crystals in the reflective display panel are distributed in a TN type. As shown in FIG. 18, the light reflected by the first pixel electrode 71 in the second electrode 31 can transmit from a side of the upper polarizer 13 after passing through the liquid crystal layer, and at this time, the reflective display panel displays in a bright state. Since the light-reflecting particles 212 in the microcapsule 21 in the transparent organic pattern 20 are located at the display side, the light-reflecting particles 212 can directly reflect the external light, so that the region A' where the transparent organic pattern is located, i.e., the brightening sub-region D, is white, thereby avoiding the influence of the luminous efficacy of the liquid crystals on improving the reflectivity and improving the brightness in the bright state.

Since the reflectivity of the light-reflecting particles 212 is higher than the reflectivity of the liquid crystal layer, the influence of the luminous efficacy of the liquid crystals on improving the reflectivity is avoided, and the reflectivity of reflective display panel may be significantly improved.

When the reflective display panel is powered on, as shown in FIG. 16, the liquid crystals are arranged vertically under the action of an electric field, and the light reflected by the second electrode 31 cannot pass through the upper polarizer 13, the color sub-region E is in a dark state. Voltages are applied to the second electrode 31 (that is, the second pixel electrode 72) and the first electrode 30 to form the electric field perpendicular to the first substrate, and the light-absorbing particles 211 are close to the display side with respect to the light-reflecting particles 212 under the action of the electric field. Since the light-absorbing particles 211 can absorb the external light, the brightening sub-region D is in the dark state.

In this way, the reflectivity of the reflective display panel in the dark state is reduced, thereby improving the contrast ratio of the reflective display panel. The data signal for controlling the brightening sub-region D is for example the direct current signal, and the data signal for controlling the color sub-region E is for example an alternating current signal.

Optionally, as shown in FIG. 16 or FIG. 18, the liquid crystal layer does not provided in the region A', where the transparent organic pattern 20 is located, between the first substrate 101 and the second substrate 102, to sufficiently ensure the functions of the light absorbing particles 211 and the light reflecting particles 212 in the microcapsule 21 in the transparent organic pattern 20.

Alternatively, in some embodiments, the liquid crystal layer is located in the region A', where the transparent organic pattern 20 is located, between the transparent organic pattern 20 and the second substrate 102, and a thickness of the liquid crystal layer is less than a thickness of the transparent organic pattern 20 to prevent the external light from being affected by the liquid crystal layer before being incident on the particles in the microcapsule 21.

Some embodiments of the present disclosure provide a display device. The display device includes any one of the display panels as described above, and has the same structure and beneficial effects as the display panel. The structure and beneficial effects have been illustrated in detail in the above embodiments, which will not be repeated herein.

The display device is for example a reflective display device or a half-transmitting and half-reflecting display device, and is illustrated below by taking the display device being the reflective display device as an example.

Based on this, the reflective display device further includes a driving circuit used to drive the reflective display panel to display.

In some embodiments, when the substrate of the reflective display panel at the display side is a substrate shown in FIG. 2, the driving circuit is the same as a driving circuit of the conventional reflective display panel having RGBW sub-pixels, and each of the sub-pixels is driven by a separate TFT.

In some embodiments, when the substrate of the reflective display panel at the display side is a substrate shown in FIG. 1, the array substrate can be any one of structures shown in FIG. 10, FIG. 11 and FIG. 12, so that the color sub-pixel region A and the brightening sub-region D can be driven by different TFTs.

The above descriptions are merely the embodiments of the present disclosure, but the scope of the present disclosure is not limited thereto, and changes and modifications within the technical scope of the disclosure that can be easily thought by those skilled in the art should be considered to be within the scope of the disclosure. Therefore, the scope of protection of the present disclosure should be subject to the scope of protection of the claims.

What is claimed is:
1. A substrate, comprising:
 a base;
 a first electrode provided on the base; and
 a plurality of transparent organic patterns provided on a surface of the first electrode away from the base, wherein, part of each of a plurality of color sub-pixel regions of the substrate overlaps with a region where each of the plurality of transparent organic patterns is located, remaining part of each of the plurality of color sub-pixel regions of the substrate dose not overlap with the region where each of the plurality of transparent organic patterns is located, and each of the plurality of color sub-pixel regions includes one of the plurality of transparent organic patterns, and wherein, microcapsules are scattered in each of the plurality of transparent organic patterns, each of the microcapsules comprises a capsule shell, and light-absorbing particles and light-reflecting particles which are moveable in the capsule shell, moving directions of the light-absorbing particles are substantially opposite to moving directions of the light-reflecting particles under an action of an electric field having an electric field direction perpendicular to a surface of the base on which the first electrode is provided, and the first electrode is included in electrodes forming the electric field.

2. The substrate according to claim 1, wherein the substrate is a substrate of a display panel at a display side.

3. The substrate according to claim 2, wherein the display panel is a reflective display panel or a half-transmitting and half-reflecting display panel.

4. The substrate according to claim 3, wherein the substrate is a color film substrate, the color film substrate has brightening sub-pixel regions, and the plurality of transparent organic patterns are located in the brightening sub-pixel regions respectively.

5. The substrate according to claim 3, wherein the substrate is a color film substrate, each of the plurality of color sub-pixel regions comprises a color sub-region and a brightening sub-region, and the plurality of transparent organic patterns are located in brightening sub-regions of the plurality of color sub-pixel regions, respectively.

6. The substrate according to claim 3, wherein the light-absorbing particles are black particles, and the light-reflecting particles are white particles.

7. The substrate according to claim 6, wherein each of the black particles comprises a carbon black particle, and/or, each of the white particles comprises a titanium dioxide particle.

8. A method for manufacturing the substrate according to claim 1, comprising:
  forming a first electrode on a base; and
  coating a transparent organic solution on the base on which the first electrode has been formed, and patterning the transparent organic solution to form a plurality of transparent organic patterns on the first electrode, wherein
  part of each of a plurality of color sub-pixel regions of the substrate overlaps with a region where each of the plurality of transparent organic patterns is located, remaining part of each of the plurality of color sub-pixel regions of the substrate dose not overlap with the region where each of the plurality of transparent organic patterns is located, and each of the plurality of color sub-pixel regions includes one of the plurality of transparent organic patterns, and wherein
  microcapsules are scattered in each of the plurality of transparent organic patterns, each of the microcapsules comprises a capsule shell, and light-absorbing particles and light-reflecting particles which are moveable in the capsule shell, moving directions of the light-absorbing particles are substantially opposite to moving directions of the light-reflecting particles under an action of an electric field having an electric field direction perpendicular to a surface of the base on which the first electrode is provided, and the first electrode is included in electrodes forming the electric field.

9. The method according to claim 8, wherein the substrate is a substrate of a display panel at a display side.

10. The method according to claim 9, wherein the display panel is a reflective display panel or a half-transmitting and half-reflecting display panel.

11. The method according to claim 9, further comprising:
  preforming a pre-power-up process for the base on which the plurality of transparent organic patterns have been formed, so that the light-reflecting particles are closer to a side of the capsule shell close to the base with respect to the light-absorbing particles in the microcapsule.

12. A display panel, comprising a first substrate and a second substrate provided opposite to each other, and a first electrode, a plurality of transparent organic patterns and a plurality of second electrodes arranged between the first substrate and the second substrate in sequence, wherein
  part of each of a plurality of color sub-pixel regions of the display panel overlaps with a region where each of the plurality of transparent organic patterns is located, remaining part of each of the plurality of color sub-pixel regions of the substrate dose not overlap with the region where each of the plurality of transparent organic patterns is located, and each of the plurality of color sub-pixel regions includes one of the plurality of transparent organic patterns, and wherein
  microcapsules are scattered in each of the plurality of transparent organic patterns, each of the microcapsules comprises a capsule shell, and light-absorbing particles and light-reflecting particles which are moveable in the capsule shell, moving directions of the light-absorbing particles are substantially opposite to moving directions of the light-reflecting particles under an action of an electric field formed by the first electrode and a corresponding one of the plurality of second electrodes, and the electric field is perpendicular to the first substrate.

13. The display panel according to claim 12, wherein the display panel is a reflective display panel or a half-transmitting and half-reflecting display panel.

14. The display panel according to claim 13, wherein the first substrate is a base of a color film substrate, the display panel has brightening sub-pixel regions, and the plurality of transparent organic patterns are located in the brightening sub-pixel regions respectively.

15. The display panel according to claim 13, wherein the first substrate is a base of a color film substrate, each of the plurality of color sub-pixel regions comprises a color sub-region and a brightening sub-region, and the plurality of transparent organic patterns are located in brightening sub-regions of the plurality of color sub-pixel regions respectively.

16. The display panel according to claim 15, wherein, the first electrode is located on a side of the plurality of transparent organic patterns close to the first substrate;
  each of the plurality of second electrodes comprise a first pixel electrode located in a corresponding one of color sub-regions of the plurality of color sub-pixel regions and a second pixel electrode located in a corresponding one of the brightening sub-regions, and the first pixel electrode and the second pixel electrode are driven by different data lines.

17. The display panel according to claim 13, wherein the display panel is a reflective display panel;

the first substrate is a base of the reflective display panel at a display side, the reflective display panel further comprises a liquid crystal layer provided between the first substrate and the second substrate, and wherein the liquid crystal layer is not provided in regions, where the plurality of transparent organic patterns are located, between the first substrate and the second substrate, or, the liquid crystal layer is located between the plurality of transparent organic patterns and the second substrate, and a thickness of the liquid crystal layer is less than a thickness of each of the plurality of transparent organic patterns.

18. The display panel according to claim 13, wherein the light-absorbing particles are black particles, and the light-reflecting particles are white particles.

19. A display device comprising the display panel according to claim 12.

20. The display device according to claim 19, wherein the display panel is a reflective display panel or a half-transmitting and half-reflecting display panel.

\* \* \* \* \*